United States Patent
Dähler et al.

(10) Patent No.: US 6,178,076 B1
(45) Date of Patent: Jan. 23, 2001

(54) POWER-ELECTRONIC CIRCUIT ARRANGEMENT FOR COMPENSATING FOR MAINS SYSTEM DISTURBANCES AND MAINS VOLTAGE REDUCTIONS

(75) Inventors: Peter Dähler, Remigen; Horst Grüning, Wettingen, both of (CH)

(73) Assignee: Asea Brown Boveri AG, Baden (CH)

( * ) Notice: Under 35 U.S.C. 154(b), the term of this patent shall be extended for 0 days.

(21) Appl. No.: 09/285,448

(22) Filed: Apr. 2, 1999

(30) Foreign Application Priority Data

Apr. 2, 1998 (DE) .............................................. 198 14 767

(51) Int. Cl.$^7$ ...................................................... H02J 3/12
(52) U.S. Cl. ............................ 361/90; 361/115; 307/102; 307/64; 323/207
(58) Field of Search ................................ 361/21, 90, 115; 307/43, 44, 45, 64, 65, 75, 80, 81, 98, 99, 102, 103; 323/205, 207

(56) References Cited

U.S. PATENT DOCUMENTS

| | | | |
|---|---|---|---|
| 5,329,222 | * | 7/1994 | Gyugyi et al. ......................... 307/102 |
| 5,343,139 | * | 8/1994 | Gyugyi et al. ......................... 323/207 |
| 5,485,075 | * | 1/1996 | Mori et al. ............................ 323/207 |
| 5,610,501 | * | 3/1997 | Nelson et al. ......................... 323/207 |
| 5,729,120 | * | 3/1998 | Stich et al. ............................. 307/64 |
| 5,754,035 | * | 5/1998 | Sen ........................................ 323/207 |
| 5,949,221 | * | 9/1999 | Edwards ................................ 323/207 |

* cited by examiner

Primary Examiner—Stephen W. Jackson
Assistant Examiner—Rios Roberto
(74) Attorney, Agent, or Firm—Burns, Doane, Swecker & Mathis, L.L.P.

(57) ABSTRACT

In a power-electronic circuit arrangement for compensating for mains system voltage reductions and mains system disturbances, a second auxiliary voltage source is provided, whose voltage is chosen to be less than that of the first auxiliary voltage source. The second auxiliary voltage source can be coupled to the feeder converter with the aid of a switch. The circuit according to the invention can thus operate in two different modes: when the first auxiliary voltage source is coupled to the feeder converter, the available voltage is sufficiently high to compensate for mains system failures or mains system voltage reductions. However, when less severe disturbances occur, the second, lower auxiliary voltage source is coupled to the feeder converter, and mains system disturbances can in consequence be compensated for without any major switching losses. The circuit then operates in a regulated mode, and the switching losses of the semiconductor switches in the feeder converter can be kept at an acceptable level, which is typically less than the losses when switched on. A further option for influencing the voltage is achieved by pulsing, in particular by pulse-width modulation of the switches, in a regulated mode.

2 Claims, 1 Drawing Sheet

POWER-ELECTRONIC CIRCUIT ARRANGEMENT FOR COMPENSATING FOR MAINS SYSTEM DISTURBANCES AND MAINS VOLTAGE REDUCTIONS

BACKGROUND OF THE INVENTION

1. Field of the Invention

The invention relates to the field of power electronics, wherein mains system disturbances and mains voltage reductions occur in a voltage supply system.

2. Discussion of Background

Circuit arrangements of this type, also known as Dynamic Voltage Restorers (DVR), supply a separate voltage, in series with the disturbed voltage supply mains system, in order to compensate for mains voltage reductions and mains system disturbances. In consequence, only insignificant changes and disturbances can be recorded on the load. To this end, the feeder converter must react very quickly, which means that the power semiconductor switches in the converter have to have a high clock frequency. This also results in the requirement that the filter connected on the mains system side of the feeder transformer must be kept as small as possible. In conventional systems for low and medium power levels, it is possible to use IGBTs and a comparatively low intermediate-circuit voltage. During operation at the required clock frequencies in such configurations, the switched-on losses of the elements are typically the governing factor, to such an extent that no further measures can be taken to reduce the overall losses significantly. At higher power levels, it is on the one hand increasingly more difficult to use IGBTs, and on the other hand the intermediate-circuit voltage must be increased in order that the currents that occur can still be coped with well. In addition, conventional GTOs have the disadvantage that they cannot be switched fast enough. In general, the switching losses in silicon semiconductor switches tend to increase at higher voltage loads. This applies to both IGBTs and GTOs. Modern, hard-driven GCTs (Gate Commutated Thyristors) can, furthermore, be produced with lower switched-on losses than IGBTs. The ratio of the switched-on losses to the switching losses is thus shifted to a major extent toward the switching losses for high-power applications, particularly with respect to the use of GCTs.

SUMMARY OF THE INVENTION

Accordingly, one object of the invention is to provide a novel circuit arrangement for compensating for mains system disturbances and mains voltage reductions, which can also be used economically for high-power applications. In particular, the intention is to make it possible to keep the switching losses in operation low, while increasing the overall efficiency of the system and the load capacity of the semiconductors.

This object is achieved by a power-electronic circuit arrangement for compensating for mains system disturbances and mains voltage reductions in a voltage supply system, the circuit arrangement comprising a feeder converter, which is connected via a feeder transformer to the voltage supply mains system, is fed from a first auxiliary voltage source with a first auxiliary voltage U1 and which, when mains system disturbances or mains voltage reductions are present, is designed to feed a compensating voltage into the voltage supply mains system, and the circuit arrangement further comprising a filter which can be connected in parallel with the feeder transformer, on the mains system side, and wherein at least one second auxiliary voltage source is provided, with a second auxiliary voltage U2 which can be coupled to the feeder converter instead of the first auxiliary voltage source, in which case the second auxiliary voltage U2 is chosen to be less than the first auxiliary voltage U1.

The essence of the invention is thus to provide a second auxiliary voltage source, whose voltage is chosen to be lower than that of the first auxiliary voltage source. The second auxiliary voltage source can be coupled to the feeder converter with the aid of a switch. The circuit according to the invention can thus operate in two different modes: when the first auxiliary voltage source is coupled to the feeder converter, the available voltage is sufficiently high to compensate for mains system undervoltages or overvoltages. On the other hand, when less severe disturbances occur, the second, lower auxiliary voltage source is coupled to the feeder converter, and mains system disturbances can in consequence be compensated for without any major switching losses. The circuit then operates in a regulated mode, and the switching losses of the semiconductor switches in the feeder converter can be kept at an acceptable level, which is typically less than the losses when switched on. A further option for influencing the voltage is achieved by pulsing, in particular by pulse-width modulation of the switches, in the regulated mode.

Further advantageous embodiments result from the corresponding dependent claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

Figure 1:
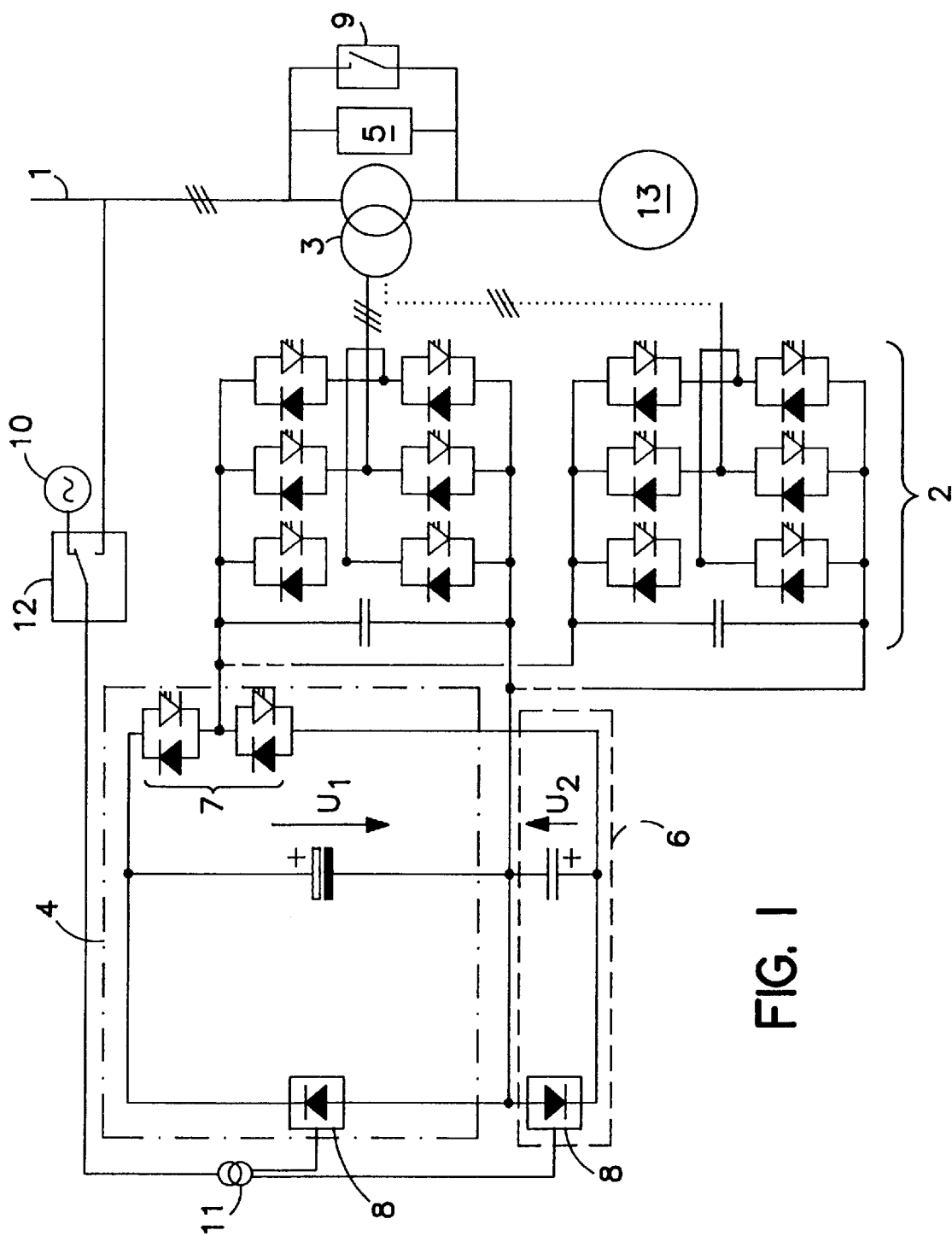
FIG. 1 shows an exemplary embodiment of the invention.

The reference numerals used in the drawing, and their meanings, are listed in summarized form in the List of Designations.

DESCRIPTION OF THE PREFERRED EMBODIMENT

Referring now to the drawing, FIG. 1 shows a preferred exemplary embodiment of the invention. 1 denotes a three-phase voltage supply mains system. In order to compensate for brief mains voltage reductions and in order to compensate for mains disturbances, the circuit arrangement according to the invention feeds a separate voltage into the mains system, so that only minor changes or disturbances can be recorded on the load 13. To this end, the circuit arrangement comprises a feeder converter 2, which is coupled to the mains system 1 via a feeder transformer 3. The feeder converter 2 is composed, in particular, of two converter elements, which are each designed in three-phase form and are formed from turn-off thyristors with a back-to-back connected diode. The turn-off thyristors are preferably hard-driveable GTOs or GCTs (Gate Commutated Thyristors). The feeder converter 2 is fed from a first auxiliary voltage source 4. A second auxiliary voltage source 6 is also provided. The auxiliary voltage sources 4 and 6 are each composed, for example, of a capacitor which is fed from a rectifier 8. The rectifier 8 obtains its supply voltage either from the mains system 1, in order to charge the capacitors in the auxiliary voltage sources 4 and 6 during normal operation, or from an auxiliary power supply 10, which could feed the load 13 without any interruption in the event of longer-lasting mains system failures. A changeover switch 12 is provided to switch over between the mains system 1 and the auxiliary power supply 10. For voltage matching, a transformer 11 may additionally be connected upstream of the rectifiers 8. The two auxiliary voltage sources 4 and 6 may optionally be coupled to the feeder converter 2 with the aid of the changeover switch 7. As shown, the changeover switch 7 is composed, for example, of two series-connected turn-off thyristors with a back-to-back connected diode. The voltage U2 of the second auxiliary voltage source is, in particular, chosen to be less than the voltage U1 of the first source.

The circuit operates as follows:

Normally, the feeder converter 2 is not pulsed. In this case, the turn-off thyristors, which are connected to the negative pole of the first and second auxiliary voltage sources 4 and 6, are switched on. They form a continuous short circuit via the terminals of the feeder transformer 3, so that the mains voltage is passed on to the load 13 without being influenced.

When mains voltage reductions occur, the upper thyristor in the changeover switch 7 is closed, and the lower is opened, so that the first auxiliary voltage source 4 is coupled to the feeder converter 2. The thyristors in the feeder converter are pulsed such that the voltage reduction can be bridged. In particular, the switches are pulse-width modulated. In this case, the feeder converter has to react very quickly, so that a very high clock frequency of, for example, 21×rated frequency=1050 Hz is required.

When the upper thyristor in the changeover switch is opened and the lower is closed, then the second auxiliary voltage source 6 is coupled to the feeder converter 2. The circuit now operates in a regulated mode. A reduced voltage is applied to the feeder converter 2. This also allows only a lower voltage to be supplied. However, this mode is required only to smooth out mains system disturbances. One advantage of this mode is that the switching losses of the thyristors in the feeder converter 2 are far less than the switched-on losses, owing to the lower operating voltage. Furthermore, the clock frequency in this mode can also be chosen to be lower, thus further reducing the switching losses.

The regulated mode is more common in normal circumstances than the mode in which mains voltage reductions have to be compensated for. The circuit arrangement according to the invention is thus mainly operated such that the switching losses are not crucial. In this way, the overall losses are kept low.

Furthermore, for applications in which the regulation range is small (for example <5%) and the load 13 has a power factor considerably less than unity (for example cosφ=0.8) it is possible to dispense entirely with the rectifier circuit 8 for the second auxiliary voltage source. The feeder converter 2 can then be pulsed such that its output voltage is offset through 90° with respect to the load current on the secondary side of the feeder transformer 3. In this way, no real power need be transmitted by the feeder converter 2.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A power-electronic circuit arrangement for compensating for mains system disturbances and mains voltage reductions in a voltage supply system comprising:

a) a feeder converter which is connected via a feeder transformer to the voltage supply mains system, is fed from a first auxiliary voltage source with a first auxiliary voltage and which, when mains system disturbances or mains voltage reductions are present, is designed to feed a compensating voltage into the voltage supply mains system; and b) a filter which can be connected in parallel with the feeder transformer on the mains system side; wherein c) at least one secondary auxiliary voltage source is provided, with a second auxiliary voltage which can be coupled to the feeder converter instead of the first auxiliary voltage source, in which case the second auxiliary voltage is chosen to be less than the first auxiliary voltage.

2. The circuit arrangement as claimed in claim 1, wherein the feeder converter is pulse-width-modulated during mains system disturbances.

\* \* \* \* \*